United States Patent
Jiang et al.

(10) Patent No.: US 8,701,490 B2
(45) Date of Patent: Apr. 22, 2014

(54) Z-AXIS CAPACITIVE ACCELEROMETER

(75) Inventors: Leyue Jiang, Jiangsu (CN); Hanqin Zhou, Jiangsu (CN); Yang Zhao, Andover, MA (US)

(73) Assignee: MEMSIC, Inc., Andover, MA (US)

( * ) Notice: Subject to any disclaimer, the term of this patent is extended or adjusted under 35 U.S.C. 154(b) by 343 days.

(21) Appl. No.: 13/180,970

(22) Filed: Jul. 12, 2011

(65) Prior Publication Data
US 2012/0125103 A1 May 24, 2012

(30) Foreign Application Priority Data
Nov. 19, 2010 (CN) .......................... 2010 1 0552669

(51) Int. Cl.
*G01P 15/125* (2006.01)
(52) U.S. Cl.
USPC ....................................... 73/514.32

(58) Field of Classification Search
USPC ....................................... 73/514.32
See application file for complete search history.

(56) References Cited

U.S. PATENT DOCUMENTS

2004/0231420 A1* 11/2004 Xie et al. .................. 73/514.32

\* cited by examiner

*Primary Examiner* — Hezron E Williams
*Assistant Examiner* — Gregory J Redmann
(74) *Attorney, Agent, or Firm* — Preti Flaherty Beliveau & Pachios LLP

(57) ABSTRACT

A Z-axis capacitive accelerometer includes a substrate, a capacitance sensing plate, a proof mass and at least one pair of spring beams. The capacitance sensing plate includes two symmetrical sense areas to create differential capacitive measurement. A decoupling structure separates the proof mass and the capacitance sensing plate and their rotational motions from each other. In the proposed Z axis capacitive accelerometer, the distance of the capacitance sensing plate relative to its rotation axis is considerably increased, thereby effectively enhancing the sensitivity when measuring the Z-axis acceleration.

11 Claims, 2 Drawing Sheets

Z-AXIS CAPACITIVE ACCELEROMETER

CROSS-REFERENCE TO RELATED APPLICATION

This application claims priority of Chinese Patent Application No. 201010552669.3, filed on Nov. 19, 2010, entitled "Z-Axis Capacitive Accelerometer" by Leyue JIANG, Hanqin ZHOU, and Yang ZHAO, the disclosure of which is incorporated herein by reference in its entirety.

FIELD OF THE INVENTION

The present invention relates to a Micro-Electro-Mechanical System (MEMS) capacitive accelerometer, and more particularly to a capacitive accelerometer for measuring the Z-axis (out-of-plane) acceleration.

BACKGROUND OF THE INVENTION

With the development of micro-electro-mechanical system (MEMS) technology, micro-size, reliable, and low-cost silicon accelerometers have been in volume production and widely adopted in automotive, consumer electronics, and industrial applications.

The operation principle of the differential capacitive micro-accelerometer is as follows. A proof mass is suspended above the substrate by spring beams/tethers and deflects in the plant of the substrate in the present of an acceleration field. When the proof mass moves, the gap between capacitors would decrease on one side while increasing on the other, resulting in a differential capacitance variation for measurement of acceleration.

To detect an out-of-plane (Z-axis) acceleration, the capacitive accelerometer is usually designed with torsional parallel-plates. Since the plate weight (proof mass) is asymmetrically distributed with respect to the rotational axis, acceleration along the normal axis to the substrate will make the top plate rock in one direction or another and thus cause differential change of capacitance on the two sides of the rotational axis.

However, in the conventional design of Z-axis accelerometer, a significant part of the poof mass to the far tip cannot be utilized for sensing, but only for creating imbalanced motion in response to inertial force, and the unused sensing area would have the largest signal displacement. This substantially limits the die area efficiency for electrical sensitivity.

SUMMARY OF THE INVENTION

The present invention relates to a Z-axis micro-machined capacitive accelerometer design of higher sensitivity than that of existing design, given the same substrate area.

In one embodiment, the Z-axis micro-machined accelerometer separates the mechanical structure into a parallel-plate capacitance sensing portion and a proof mass portion using 3 pairs of elastic torsion springs and 3 anchor areas, allowing the sensing areas to be at the ends of the structure with the largest displacement. In the presence of an out-of-plane acceleration, the sensing plate and proof mass will rotate in different directions (one clockwise while the other anti-clockwise). The sensing areas are placed at the right and left ends, respectively, and then would experience maximum vertical displacement which results in a larger capacitance sensitivity.

In one embodiment, the capacitance sensing plate has the rotation axis 1, the proof mass has the rotation axis 2, and these two rotation axes are parallel to each other.

In one embodiment, the differential capacitance sensing plate areas are symmetrical with respect to the first rotation axis.

In one embodiment, the second rotation axis is placed at one side of the proof mass.

In one embodiment, the spring beams are parallel to the first and the second rotation axes.

In one embodiment, the first rotation axis consists of a pair of spring beams (upper and lower) which are of the same length. There are two anchor points fix the beams to the substrate.

In one embodiment, the second rotation axis consists of a pair of spring beams (upper and lower) which are of the same length. There is one anchor point fix the two beams to the substrate.

In one embodiment, the spring beam pair consists of an upper and a lower spring beams of the same length.

In one embodiment, the rotation direction of the capacitance sensing plate is opposite to the rotation direction of the proof mass.

Compared with the embodiments of related art, the present invention has the following advantages. In the Z-axis capacitive accelerometer according to the present invention, a mechanical structure in which the proof mass and the capacitance sensing plate are decoupled from each other is adopted, and the differential capacitance sensing plates are placed opposite at the two sides of the rotational axis and outside the proof mass, wherein the opposite means the plates can be placed either symmetrical and nonsymmetrical to the rotational axis. The average distance of the capacitance sensing plate to the rotation axis is thus increased. Given the same angular displacement, the capacitance change of the sensing plate will be increased significantly, thereby effectively improving the sensitivity of acceleration measurement.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
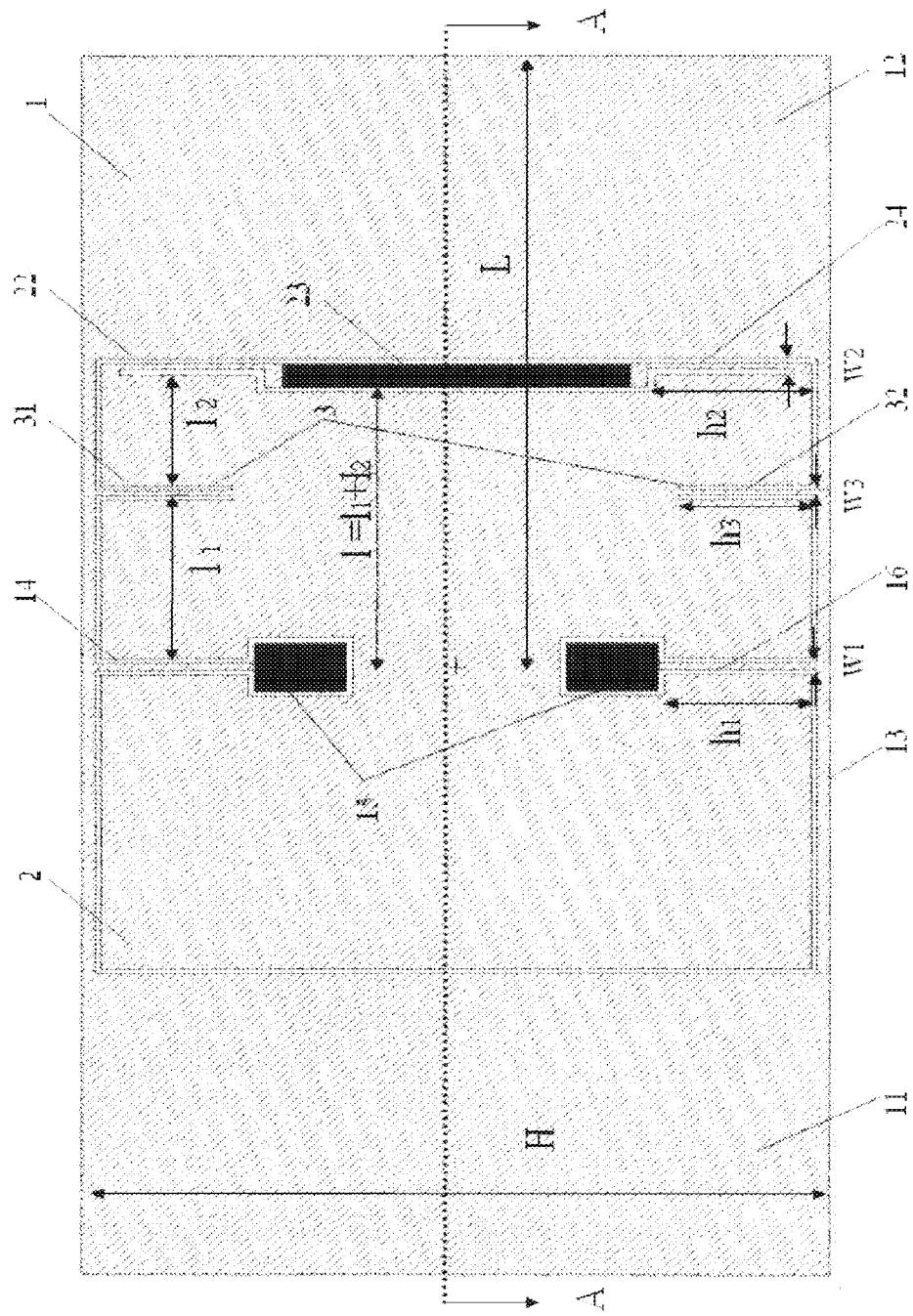
FIG. 1 is a plan view of the structure of the Z-axis capacitive accelerometer according to one embodiment of the present invention.
Figure 2:
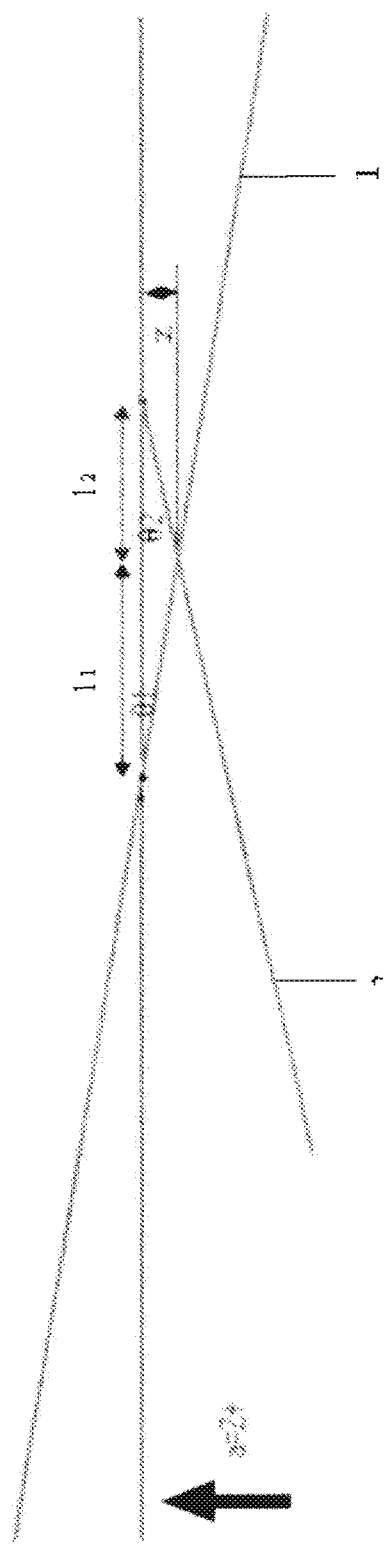
FIG. 2 is a cross-sectional view of the deformed structure in response to a Z-axis acceleration along the line A-A as shown in FIG. 1, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

The description will be made as to the embodiments of the present invention in conjunction with the accompanying Figures.

Referring to FIG. 1, a Z-axis capacitive accelerometer according to the present invention has a proof mass and a capacitance sensing plate whose rotational movements can be mechanically decoupled.

One embodiment of the present invention comprises of at least a pair of spring beams, 3 anchor points, and 2 rotational axes as shown in FIG. 1.

The outer sensing plate is nearly symmetric from left to right around anchor points (15 in FIG. 1), except for an attachment to the proof plate at spring beam pair 3.

Spring beam pair 1 (14 & 16 in FIG. 1) is the sensing plate symmetric torsion axis having anchor points (15 in FIG. 1).

Spring beam pair 2 (22 & 24 in FIG. 1) is the proof mass asymmetric torsion axis having the anchor point (23 in FIG. 1), providing the torque for displacement in response to acceleration.

Spring beam pair 3 (31 & 32 in FIG. 1) provides mechanical decoupling between the proof mass and the capacitance sensing plate with mechanical amplification and separation of rotation directions.

The length of beam pair 1 is h1 (assuming upper and lower of equal length).

The length of beam pair 2 is h2 (assuming upper and lower of equal length).

The length of beam pair 3 is h3 (assuming upper and lower of equal length). The horizontal distance from the centerline of beam pair 1 to the centerline of beam pair 3 is $l_1$.

The horizontal distance from the centerline of beam pair 3 to the centerline of beam pair 2 is $l_2$.

The horizontal distance from the centerline of beam pair 1 to the centerline of beam pair 2 is $l=l_1+l_2$.

The overall dimension of the mechanical structure is 2L (x-axis dimension) by H (y-axis dimension).

The spring constants for the beam pairs 1, 2, 3 can be calculated as follows:

$$k_1 = \frac{2J_1 G}{h_1} = \frac{2tw_1^3 G}{3h_1}$$

$$k_2 = \frac{2J_2 G}{h_2} = \frac{2tw_2^3 G}{3h_2}$$

$$k_3 = \frac{2J_3 G}{h_3} = \frac{2tw_3^3 G}{3h_3},$$

where $J_x$ is the corresponding moment of inertia, G is the shear modulus of elasticity, t is the beam thickness, $w_x$ is the corresponding beam width, and $h_x$ is the corresponding beam length.

When an external acceleration a is applied, the angular displacement will be $$\theta_1 = \frac{2\rho t H l^2 r}{k_1 + k_2 r^2 + k_3 (1+r)^2} a,$$

where $r=l_1/l_2$, $\rho$ is the plate density, and t is the plate thickness.

The resultant capacitance change is $$\Delta C = \frac{1}{2} \frac{\varepsilon H}{d^2} (L^2 - l^2) \theta_1.$$

In the present invention of Z-axis capacitive accelerometer, a decoupling structure which separates rotational movement of the capacitance sensing plate and the proof mass is employed.

The differential capacitance change in the present invention is greater than the differential capacitance change of prior art for the same angular displacement. In case of the same substrate area and mechanical resonance frequency, larger sensitivity in response to Z-axis acceleration can be achieved than conventional Z-axis capacitive accelerometers with a single torsion axis and asymmetrical capacitance sensing plate/proof mass.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A Z-axis capacitive accelerometer, comprising:
   a substrate;
   a capacitance sensing plate;
   a proof mass; and
   at least one pair of spring beams,
   wherein the proof mass and the capacitance sensing plate are separated from each other, and two sensing areas of differential capacitance are located opposite to a rotational axis of the sensing plate and outside the proof mass, and when the proof mass rotates in a first direction due to an applied acceleration, the capacitance sensing plate rotates in an opposite direction to create the angular displacement for measurement,
   wherein the capacitance sensing plate has a first rotation axis, the proof mass has a second rotation axis and the first and second rotation axes are parallel to each other, and
   wherein the first rotation axis comprises:
     an upper first rotation axis;
     a lower first rotation axis; and
     a first anchor point connecting the upper first rotation axis and the lower first rotation axis.

2. The Z-axis capacitive accelerometer according to claim 1, wherein the positive capacitance sensing plate and the negative capacitance sensing plate are symmetrical relative to the first rotation axis.

3. The Z-axis capacitive accelerometer according to claim 1, wherein the second rotation axis is disposed at one side edge of the proof mass.

4. The Z axis capacitive accelerometer according to claim 1, wherein the proof mass is substantially symmetrical relative to the first rotation axis.

5. The Z-axis capacitive accelerometer according to claim 1, wherein a pair of spring beams are parallel to the first rotation axis and the second rotation axis.

6. The Z-axis capacitive accelerometer according to claim 1, wherein:
the lower first rotation axis has a same length as the upper first rotation axis.

7. The Z-axis capacitive accelerometer according to claim 1, wherein the second rotation axis comprises:
an upper second rotation axis;
a lower second rotation axis having a same length as the upper second rotation axis; and
the second anchor point connecting the upper second rotation axis and the lower second rotation axis.

8. The Z-axis capacitive accelerometer according to claim 1, wherein the spring beam comprises an upper spring beam and a lower spring beam having the same length as the upper spring beam.

9. The Z-axis capacitive accelerometer according to claim 1, wherein the second rotation axis comprises:
an upper second rotation axis;
a lower second rotation axis; and
the second anchor point connecting the upper second rotation axis and the lower second rotation axis.

10. A Z-axis capacitive accelerometer, comprising:
a substrate;
a capacitance sensing plate;
a proof mass; and
at least one pair of spring beams,
wherein the proof mass and the capacitance sensing plate are separated from each other, and two sensing areas of differential capacitance are located opposite to a rotational axis of the sensing plate and outside the proof mass, and when the proof mass rotates in a first direction due to an applied acceleration, the capacitance sensing plate rotates in an opposite direction to create the angular displacement for measurement,
wherein the capacitance sensing plate has a first rotation axis, the proof mass has a second rotation axis and the first and second rotation axes are parallel to each other, and
wherein the second rotation axis comprises:
an upper second rotation axis;
a lower second rotation axis; and
a second anchor point connecting the upper second rotation axis and the lower second rotation axis.

11. The Z-axis capacitive accelerometer according to claim 10, wherein:
the lower second rotation axis has a same length as the upper second rotation axis.

* * * * *